Figure 1:
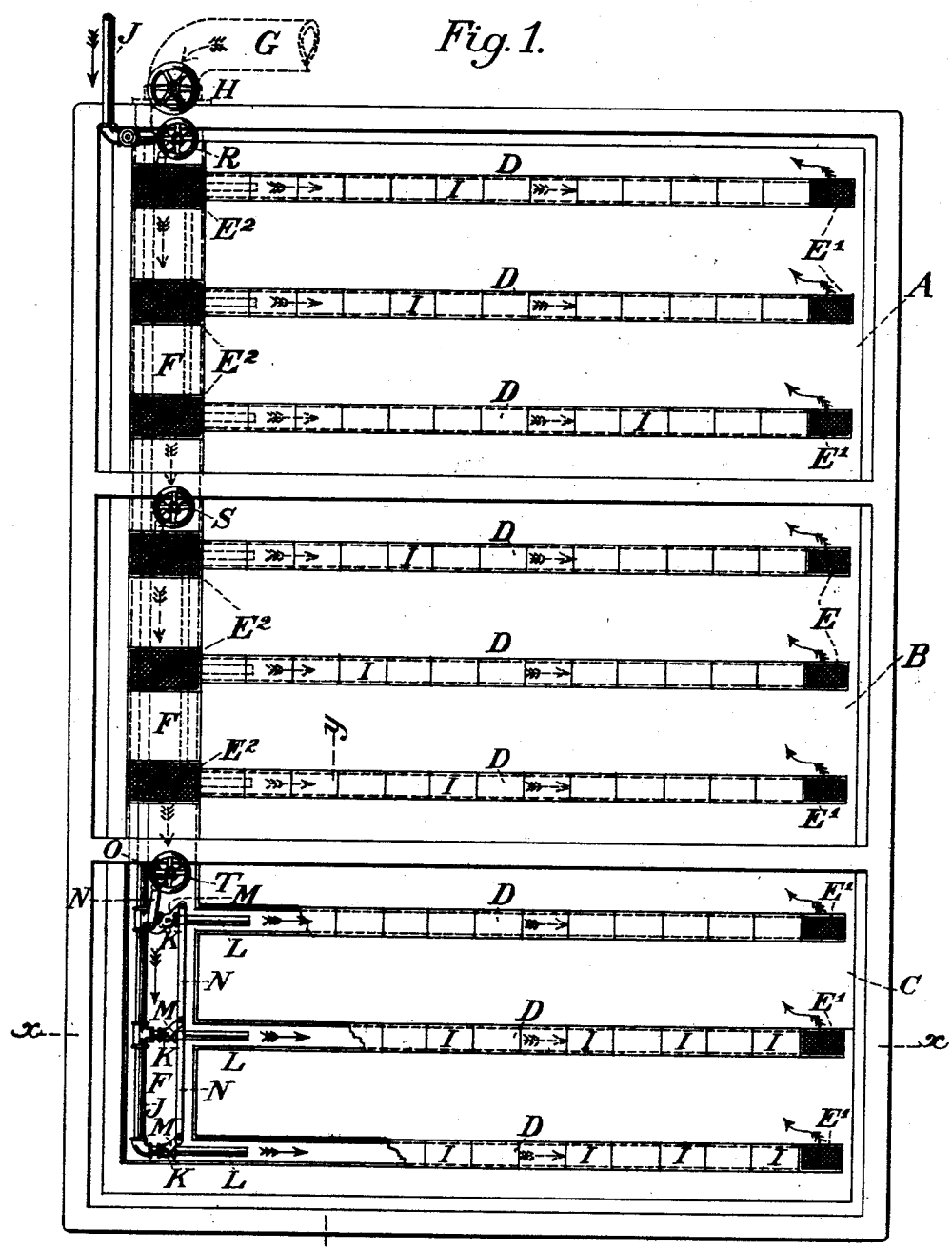

(No Model.) 2 Sheets—Sheet 1.

A. SUTRO.
SWIMMING POOL OR BATH.

No. 520,342. Patented May 22, 1894.

Witnesses:
E. N. Bromsaw
Wilson D. Bentz

Inventor:
Adolph Sutro
By John Richards
Atty (No Model.) 2 Sheets—Sheet 2.

A. SUTRO.
SWIMMING POOL OR BATH.

No. 520,342. Patented May 22, 1894.

Witnesses:
E. A. Brandau
Wilson D. Bent, Jr.

Inventor:
Adolph Sutro
By John Richards
Atty

UNITED STATES PATENT OFFICE.

ADOLPH SUTRO, OF SAN FRANCISCO, CALIFORNIA.

SWIMMING-POOL OR BATH.

SPECIFICATION forming part of Letters Patent No. 520,342, dated May 22, 1894.

Application filed August 31, 1893. Serial No. 484,478. (No model.)

*To all whom it may concern:*

Be it known that I, ADOLPH SUTRO, a citizen of the United States, and a resident of the city and county of San Francisco, State of California, have invented certain new and useful Improvements in Swimming-Pools or Baths, as set forth in the following specification and drawings herewith, which I declare to be a full, clear, and exact description of my invention and the method of applying the same in practice.

My invention relates to swimming pools or baths containing a body of water that requires both warming and circulation, and consists in the methods for attaining this object in a simple and effective manner by means of covered channels or conduits formed in the bottom of the pools or baths covered with removable plates; steam being injected into such conduits at one end or side of the pool or bath in such a manner as to circulate and warm the water without exposing persons bathing to contact with steam or hot surfaces.

My invention also consists in various expedients to carry out the invention, as will be more fully set forth in the drawings herewith, in which—

Figure 2:
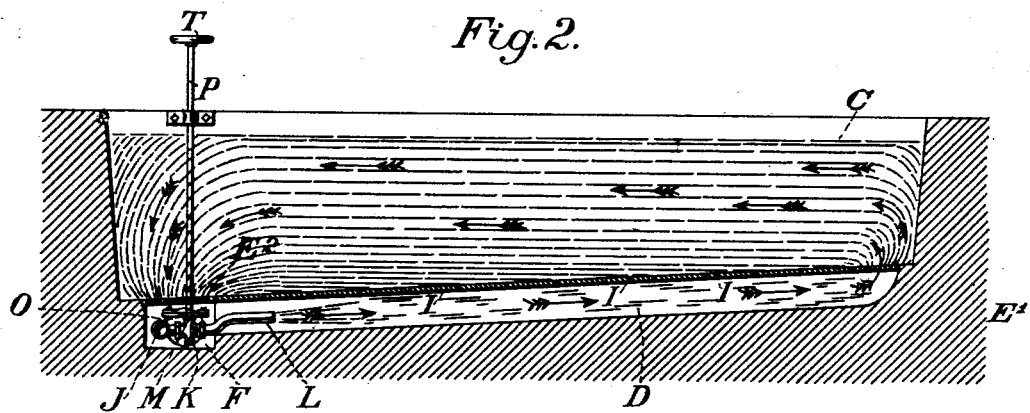
Figure 3:
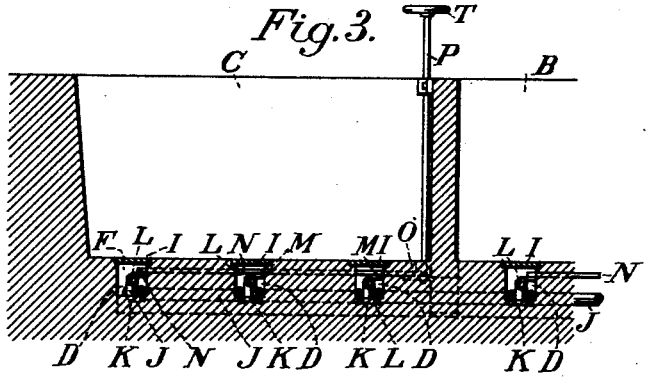
Figure 4:
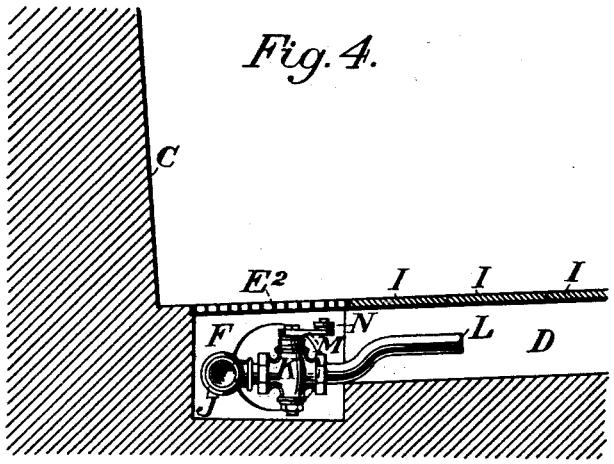

Figure 1 is a plan view of a swimming pool or bath in three divisions provided with my improvements for heating and circulating the water therein. Fig. 2 is a section on the line $x$—$x$ of Fig. 1, showing the sub-conduits for heating and circulating the water, also the method of applying steam to that purpose. Fig. 3 is a transverse section on the line $y$—$y$ of Fig. 1. Fig. 4 is an enlarged partial section across the main or feeding conduit for water also containing the steam supply pipes. This view is also on the line $x$—$x$ Fig. 1.

Similar letters of reference indicate corresponding parts in the different figures of the drawings.

Referring first to Fig. 1, it comprehends three separate bathing pools A, B and C, which are alike in every respect, but several are provided so as to maintain different degrees of temperature of the water in the several baths or pools, as may be preferred by different bathers, also to provide a relay in case of cleaning or repairing the pools. As the different pools are identical, future letters of reference will be confined mainly to the one marked C at the bottom of the sheet. Longitudinally in the bottom of the pools I form channels D extending from end to end, or between the gratings $E'$ $E^2$. These channels D intersect a main supply conduit F, which passes beneath and connects to all the pools A, B and C. This conduit F is supplied by a pipe C, or by connection in any manner with a water supply admitted or shut off by a main sluice valve at H.

Water entering directly to the bath without being circulated or heated, rises from the main conduit F through the grates $E^2$, and when required is drawn off by the usual trap ways, not shown in the drawings.

The channels D, which may be of any number, owing to their size or capacity, are rectangular in form, made with angular ledges at the top to receive a series of covering plates I, preferably made of some non-conducting material, such as earthen tile, so as to prevent conduction of heat in a degree to cause inconvenience or discomfort to bathers standing or walking on these plates or covers during the time the pool or bath is being heated.

To warm the baths, steam is supplied from a pipe J connecting to a steam boiler or other source of supply. This pipe extends entirely through the series of pools or baths, and is provided at each of the channels D with cocks K and nozzles L, so as to discharge a current of steam into the channels D as indicated by the arrows in Fig. 2. This series of cocks K in the several pools or baths A, B and C, are provided with cranks M and links N, connecting to a crank O on the vertical shafts P, so that by turning the hand wheels R, S, T, all the cocks in either of the pools or baths are opened together and uniformly. The flow of steam thus admitted creates by impulse and induction a current of water at high velocity in the channels D, discharging the same through the grating $E'$, from where it is diffused over the pool; it flows slowly back to the grating $E^2$ and is there drawn down into the main channel F and into the channels D to be again circulated, taking up the heat of the steam discharged by the nozzles L, and condensing the same without noise or disturbance. This cycle of operations goes on until the water in the pool or bath has attained the desired temperature, and the steam is shut off.

Having thus described the nature and objects of my invention and the manner of constructing and applying the same, what I claim as new, and desire to secure by Letters Patent, is—

1. In a swimming pool or bath, the combination of a series of parallel channels in the bottom thereof provided with coverings and having outlets into the bath, a water supply conduit communicating at right angles with the several channels, a steam supply pipe located in the water conduit, nozzles on the steam supply pipe entering and discharging steam into the ends of the several parallel channels, and the cocks with which the nozzles are provided, substantially as described.

2. In a swimming pool or bath, the combination of a series of parallel channels in the bottom thereof provided with sectional removable covers flush with the floor of the bath, grated outlets in the bath floor at each end of the channels for the delivery of their contents into the bath, a water supply conduit at right angles to and intersecting the several channels and communicating with each one, said conduit receiving its water from a suitable supply, and a steam supply pipe located in the water conduit and having nozzles which enter and discharge steam into the ends of the several parallel channels, said nozzles being provided with cocks to control the flow of steam, which cocks are connected together so as to be simultaneously operated, substantially as described.

3. In a swimming pool or bath, the combination of a series of parallel channels D in the bottom thereof, provided with sectional covering plates I, the grates $E'$ at one end of channels D and the grates $E^2$ at their other end, the main supply conduit F at right angles to and intersecting the channels D, the steam pipe J running longitudinally through the conduit F, said pipe J having nozzles L, entering and discharging steam into the several channels D, thereby causing a continuous circulation of the water and the cocks K for nozzles L, which cocks are connected together so as to be simultaneously operated, substantially as described.

In testimony whereof I have hereunto affixed my signature in the presence of two witnesses.

ADOLPH SUTRO.

Witnesses:
J. DARCY OSBORNE,
W. C. LITTLE.